United States Patent
Kuiper et al.

(10) Patent No.: US 8,799,904 B2
(45) Date of Patent: *Aug. 5, 2014

(54) SCALABLE SYSTEM CALL STACK SAMPLING

(75) Inventors: Kean G. Kuiper, Round Rock, TX (US); Frank E. Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/011,621

(22) Filed: Jan. 21, 2011

(65) Prior Publication Data

US 2012/0191893 A1 Jul. 26, 2012

(51) Int. Cl.
*G06F 9/455* (2006.01)
*G06F 9/44* (2006.01)

(52) U.S. Cl.
USPC .......................................... 718/100; 717/127

(58) Field of Classification Search
USPC ........... 719/310, 318; 718/100, 107; 717/126, 717/127
See application file for complete search history.

(56) References Cited

U.S. PATENT DOCUMENTS

| | | | |
|---|---|---|---|
| 5,305,454 A | 4/1994 | Record et al. | |
| 5,379,432 A | 1/1995 | Orton et al. | |
| 5,404,529 A | 4/1995 | Chernikoff et al. | |
| 5,465,328 A | 11/1995 | Dievendorff et al. | |
| 5,473,777 A | 12/1995 | Moeller et al. | |
| 5,475,845 A | 12/1995 | Orton et al. | |
| 5,544,318 A | 8/1996 | Schmitz et al. | |
| 5,625,359 A | 4/1997 | Wilson et al. | |
| 5,682,537 A | 10/1997 | Davies et al. | |
| 5,751,789 A | 5/1998 | Farris et al. | |
| 5,764,241 A | 6/1998 | Elliott et al. | |
| 5,768,500 A * | 6/1998 | Agrawal et al. | 714/47.2 |
| 5,913,213 A | 6/1999 | Wikstrom et al. | |
| 5,930,516 A | 7/1999 | Watts et al. | |
| 6,002,872 A | 12/1999 | Alexander, III et al. | |
| 6,012,094 A | 1/2000 | Leymann et al. | |
| 6,055,492 A | 4/2000 | Alexander, III et al. | |
| 6,108,654 A | 8/2000 | Chan et al. | |

(Continued)

FOREIGN PATENT DOCUMENTS

| | | |
|---|---|---|
| CN | 1614555 | 5/2005 |
| EP | 649084 A1 | 4/1995 |

(Continued)

OTHER PUBLICATIONS

Asokan-et al.; "Providing Time-and Space—Efficient Procedure Calls for Asynchronous Software Thread Integration"; pp. 167-187; Sep. 2004.

(Continued)

*Primary Examiner* — Van Nguyen
(74) *Attorney, Agent, or Firm* — Janaki K. Davda; Konrad, Raynes, Davda & Victor LLP (57) ABSTRACT

An interrupt is generated based on an event. Further, a thread is selected for monitoring. In addition, an interrupt handler captures information for the monitored thread. An affinity of the monitored thread is set such that the monitored thread runs only on a current processor without being able to migrate to a different processor. A sampler thread that runs on the current processor retrieves a call stack associated with a monitored thread after the affinity of the monitored thread has been set to the current processor.

23 Claims, 6 Drawing Sheets

(56) References Cited

U.S. PATENT DOCUMENTS

| | | | |
|---|---|---|---|
| 6,112,225 A | 8/2000 | Kraft et al. | |
| 6,125,363 A | 9/2000 | Buzzeo et al. | |
| 6,128,611 A | 10/2000 | Doan et al. | |
| 6,158,024 A | 12/2000 | Mandal | |
| 6,178,440 B1 | 1/2001 | Foster et al. | |
| 6,199,075 B1 | 3/2001 | Ungar et al. | |
| 6,233,585 B1 | 5/2001 | Gupta et al. | |
| 6,338,159 B1 | 1/2002 | Alexander, III et al. | |
| 6,438,512 B1 | 8/2002 | Miller | |
| 6,442,572 B2 | 8/2002 | Leymann et al. | |
| 6,449,614 B1 | 9/2002 | Marcotte | |
| 6,553,564 B1 | 4/2003 | Alexander, III et al. | |
| 6,601,233 B1 | 7/2003 | Underwood | |
| 6,625,602 B1 | 9/2003 | Meredith et al. | |
| 6,633,897 B1 | 10/2003 | Browning et al. | |
| 6,651,243 B1 | 11/2003 | Berry et al. | |
| 6,654,948 B1 | 11/2003 | Konuru et al. | |
| 6,658,652 B1 | 12/2003 | Alexander, III et al. | |
| 6,662,358 B1 * | 12/2003 | Berry et al. | 717/128 |
| 6,662,359 B1 | 12/2003 | Berry et al. | |
| 6,681,230 B1 | 1/2004 | Blott et al. | |
| 6,697,802 B2 | 2/2004 | Ma et al. | |
| 6,697,935 B1 | 2/2004 | Borkenhagen et al. | |
| 6,715,789 B2 | 4/2004 | Takimoto et al. | |
| 6,728,955 B1 | 4/2004 | Berry et al. | |
| 6,728,959 B1 | 4/2004 | Merkey | |
| 6,742,016 B1 | 5/2004 | Bhoj et al. | |
| 6,751,789 B1 | 6/2004 | Berry et al. | |
| 6,857,120 B1 * | 2/2005 | Arnold et al. | 717/157 |
| 6,874,074 B1 | 3/2005 | Burton et al. | |
| 6,880,086 B2 | 4/2005 | Kidder et al. | |
| 6,904,594 B1 | 6/2005 | Berry et al. | |
| 6,931,354 B2 | 8/2005 | Jones et al. | |
| 6,941,552 B1 | 9/2005 | Beadle et al. | |
| 6,954,922 B2 | 10/2005 | Liang | |
| 6,976,263 B2 | 12/2005 | Delaney | |
| 6,993,246 B1 | 1/2006 | Pan et al. | |
| 7,000,047 B2 | 2/2006 | Nguyen et al. | |
| 7,020,696 B1 | 3/2006 | Perry et al. | |
| 7,028,298 B1 | 4/2006 | Foote | |
| 7,047,258 B2 | 5/2006 | Balogh et al. | |
| 7,093,081 B2 | 8/2006 | DeWitt, Jr. et al. | |
| 7,114,036 B2 | 9/2006 | DeWitt, Jr. et al. | |
| 7,114,150 B2 | 9/2006 | Dimpsey et al. | |
| 7,162,666 B2 | 1/2007 | Bono | |
| 7,178,145 B2 | 2/2007 | Bono | |
| 7,206,848 B1 | 4/2007 | Zara et al. | |
| 7,222,119 B1 | 5/2007 | Ghemawat et al. | |
| 7,257,657 B2 | 8/2007 | DeWitt, Jr. et al. | |
| 7,278,141 B2 | 10/2007 | Accapadi et al. | |
| 7,284,238 B2 | 10/2007 | Inagaki et al. | |
| 7,296,130 B2 | 11/2007 | Dimpsey et al. | |
| 7,321,965 B2 | 1/2008 | Kissell | |
| 7,325,108 B2 | 1/2008 | Tuel | |
| 7,398,518 B2 | 7/2008 | Dichter | |
| 7,426,730 B2 | 9/2008 | Mathews et al. | |
| 7,458,078 B2 | 11/2008 | DeWitt, Jr. et al. | |
| 7,474,991 B2 | 1/2009 | DeWitt, Jr. et al. | |
| 7,496,918 B1 | 2/2009 | Dice et al. | |
| 7,526,757 B2 | 4/2009 | Levine et al. | |
| 7,529,914 B2 | 5/2009 | Saha et al. | |
| 7,574,587 B2 | 8/2009 | DeWitt, Jr. et al. | |
| 7,584,332 B2 | 9/2009 | Kogge et al. | |
| 7,587,364 B2 | 9/2009 | Crumbach et al. | |
| 7,610,585 B2 | 10/2009 | Shpeisman et al. | |
| 7,624,137 B2 | 11/2009 | Bacon et al. | |
| 7,653,895 B1 | 1/2010 | James-Roxby et al. | |
| 7,688,867 B1 | 3/2010 | Kizhepat | |
| 7,689,867 B2 | 3/2010 | Rosenbluth et al. | |
| 7,716,647 B2 * | 5/2010 | Loh et al. | 717/127 |
| 7,721,268 B2 * | 5/2010 | Loh et al. | 717/131 |
| 7,779,238 B2 | 8/2010 | Kosche et al. | |
| 7,788,664 B1 | 8/2010 | Janakiraman et al. | |
| 7,921,075 B2 | 4/2011 | Herness et al. | |
| 7,921,875 B2 | 4/2011 | Moriiki et al. | |
| 7,925,473 B2 | 4/2011 | DeWitt, Jr. et al. | |
| 7,962,913 B2 | 6/2011 | Accapadi et al. | |
| 7,962,924 B2 * | 6/2011 | Kuiper et al. | 719/321 |
| 7,996,593 B2 | 8/2011 | Blackmore et al. | |
| 7,996,629 B2 * | 8/2011 | Wan et al. | 711/147 |
| 8,018,845 B2 | 9/2011 | Ruello et al. | |
| 8,024,735 B2 | 9/2011 | Rudd et al. | |
| 8,117,599 B2 | 2/2012 | Edmark et al. | |
| 8,117,618 B2 | 2/2012 | Holloway et al. | |
| 8,132,170 B2 * | 3/2012 | Kuiper et al. | 718/100 |
| 8,136,124 B2 | 3/2012 | Kosche et al. | |
| 8,141,053 B2 * | 3/2012 | Levine | 717/127 |
| 8,156,495 B2 | 4/2012 | Chew et al. | |
| 8,191,049 B2 | 5/2012 | Levine et al. | |
| 8,286,134 B2 | 10/2012 | Jones et al. | |
| 8,381,215 B2 | 2/2013 | Johnson et al. | |
| 8,566,795 B2 | 10/2013 | Dewitt, Jr. et al. | |
| 2002/0007363 A1 | 1/2002 | Vaitzblit | |
| 2002/0016729 A1 | 2/2002 | Breitenbach et al. | |
| 2002/0038332 A1 | 3/2002 | Alverson et al. | |
| 2002/0073103 A1 | 6/2002 | Bottomley et al. | |
| 2003/0004970 A1 | 1/2003 | Watts | |
| 2003/0023655 A1 | 1/2003 | Sokolov et al. | |
| 2003/0061256 A1 | 3/2003 | Mathews et al. | |
| 2003/0083912 A1 | 5/2003 | Covington, III et al. | |
| 2003/0233394 A1 | 12/2003 | Rudd et al. | |
| 2004/0068501 A1 | 4/2004 | McGoveran | |
| 2004/0093510 A1 | 5/2004 | Nurmela | |
| 2004/0142679 A1 | 7/2004 | Kearns et al. | |
| 2004/0148594 A1 * | 7/2004 | Williams | 717/158 |
| 2004/0162741 A1 | 8/2004 | Flaxer et al. | |
| 2004/0163077 A1 | 8/2004 | Dimpsey et al. | |
| 2004/0178454 A1 | 9/2004 | Kuroda et al. | |
| 2004/0193510 A1 | 9/2004 | Catahan, Jr. et al. | |
| 2004/0215614 A1 | 10/2004 | Doyle et al. | |
| 2004/0215768 A1 | 10/2004 | Oulu et al. | |
| 2004/0216112 A1 | 10/2004 | Accapadi et al. | |
| 2004/0220931 A1 | 11/2004 | Guthridge et al. | |
| 2004/0220932 A1 | 11/2004 | Seeger et al. | |
| 2004/0220933 A1 | 11/2004 | Walker | |
| 2004/0268316 A1 | 12/2004 | Fisher et al. | |
| 2005/0021354 A1 | 1/2005 | Brendle et al. | |
| 2005/0080806 A1 | 4/2005 | Doganata et al. | |
| 2005/0086455 A1 | 4/2005 | DeWitt, Jr. et al. | |
| 2005/0091663 A1 | 4/2005 | Bagsby | |
| 2005/0102493 A1 | 5/2005 | DeWitt, Jr. et al. | |
| 2005/0102673 A1 | 5/2005 | DeWitt, Jr. et al. | |
| 2005/0138443 A1 | 6/2005 | Cooper | |
| 2005/0149585 A1 | 7/2005 | Bacon et al. | |
| 2005/0155018 A1 | 7/2005 | DeWitt, Jr. et al. | |
| 2005/0155019 A1 | 7/2005 | Levine et al. | |
| 2005/0166187 A1 | 7/2005 | Das et al. | |
| 2005/0204349 A1 | 9/2005 | Lewis et al. | |
| 2005/0256961 A1 | 11/2005 | Alon et al. | |
| 2005/0262130 A1 | 11/2005 | Mohan | |
| 2005/0273757 A1 | 12/2005 | Anderson | |
| 2005/0273782 A1 | 12/2005 | Shpeisman et al. | |
| 2006/0004757 A1 | 1/2006 | Watts | |
| 2006/0023642 A1 | 2/2006 | Roskowski et al. | |
| 2006/0031837 A1 | 2/2006 | Theurer | |
| 2006/0059486 A1 | 3/2006 | Loh et al. | |
| 2006/0072563 A1 | 4/2006 | Regnier et al. | |
| 2006/0080486 A1 | 4/2006 | Yan | |
| 2006/0095571 A1 | 5/2006 | Gilgen et al. | |
| 2006/0130001 A1 | 6/2006 | Beuch et al. | |
| 2006/0136914 A1 | 6/2006 | Marascio et al. | |
| 2006/0149877 A1 | 7/2006 | Pearson | |
| 2006/0167955 A1 | 7/2006 | Vertes | |
| 2006/0184769 A1 | 8/2006 | Floyd et al. | |
| 2006/0212657 A1 | 9/2006 | Tuel | |
| 2006/0218290 A1 | 9/2006 | Lin et al. | |
| 2006/0259911 A1 | 11/2006 | Weinrich et al. | |
| 2006/0282400 A1 | 12/2006 | Kalavacharla et al. | |
| 2006/0282707 A1 | 12/2006 | Rosenbluth et al. | |
| 2007/0006168 A1 | 1/2007 | Dimpsey et al. | |
| 2007/0033589 A1 | 2/2007 | Nicholas et al. | |
| 2007/0150904 A1 | 6/2007 | Kim et al. | |
| 2007/0169003 A1 | 7/2007 | Branda et al. | |
| 2007/0171824 A1 | 7/2007 | Ruello et al. | |

(56) References Cited

U.S. PATENT DOCUMENTS

| | | | |
|---|---|---|---|
| 2007/0220495 | A1 | 9/2007 | Chen et al. |
| 2007/0220515 | A1 | 9/2007 | DeWitt, Jr. et al. |
| 2007/0226139 | A1 | 9/2007 | Crumbach et al. |
| 2008/0082761 | A1 | 4/2008 | Herness et al. |
| 2008/0082796 | A1 | 4/2008 | Merten et al. |
| 2008/0091679 | A1 | 4/2008 | Herness et al. |
| 2008/0091712 | A1 | 4/2008 | Daherkar et al. |
| 2008/0148240 | A1 | 6/2008 | Jones et al. |
| 2008/0148241 | A1 | 6/2008 | Jones et al. |
| 2008/0148299 | A1 | 6/2008 | Daherkar et al. |
| 2008/0177756 | A1 | 7/2008 | Kosche et al. |
| 2008/0189687 | A1 | 8/2008 | Levine et al. |
| 2008/0196030 | A1 | 8/2008 | Buros et al. |
| 2008/0263325 | A1 | 10/2008 | Kudva et al. |
| 2008/0307441 | A1 | 12/2008 | Kuiper et al. |
| 2009/0007075 | A1 | 1/2009 | Edmark et al. |
| 2009/0044198 | A1 | 2/2009 | Kuiper et al. |
| 2009/0083002 | A1 | 3/2009 | DeWitt et al. |
| 2009/0100432 | A1 | 4/2009 | Holloway et al. |
| 2009/0106762 | A1 | 4/2009 | Accapadi et al. |
| 2009/0178036 | A1 | 7/2009 | Levine |
| 2009/0187909 | A1 | 7/2009 | Russell et al. |
| 2009/0187915 | A1 | 7/2009 | Chew et al. |
| 2009/0204978 | A1 | 8/2009 | Lee et al. |
| 2009/0210649 | A1 | 8/2009 | Wan et al. |
| 2009/0235247 | A1 | 9/2009 | Cho et al. |
| 2009/0235262 | A1 | 9/2009 | Ceze et al. |
| 2009/0241095 | A1 | 9/2009 | Jones et al. |
| 2009/0271549 | A1 | 10/2009 | Blackmore et al. |
| 2009/0292846 | A1 | 11/2009 | Park et al. |
| 2009/0300224 | A1 | 12/2009 | Duffy et al. |
| 2010/0017447 | A1 | 1/2010 | Jones et al. |
| 2010/0017581 | A1 | 1/2010 | Clift et al. |
| 2010/0017583 | A1 | 1/2010 | Kuiper et al. |
| 2010/0017584 | A1 | 1/2010 | Jones et al. |
| 2010/0017789 | A1 | 1/2010 | Dewitt, Jr. et al. |
| 2010/0017804 | A1 | 1/2010 | Gupta et al. |
| 2010/0036981 | A1 | 2/2010 | Ganesh et al. |
| 2010/0333071 | A1 | 12/2010 | Kuiper et al. |
| 2011/0289361 | A1* | 11/2011 | Kuiper et al. ............ 714/45 |
| 2011/0307640 | A1 | 12/2011 | Jones et al. |
| 2011/0320173 | A1 | 12/2011 | Levine |

FOREIGN PATENT DOCUMENTS

| | | | |
|---|---|---|---|
| EP | 000689141 | A2 | 12/1995 |
| EP | 1603307 | A2 | 12/2005 |
| JP | 11-327951 | | 11/1999 |
| JP | 2002-055848 | | 2/2002 |
| JP | 2004-19330 | | 7/2004 |
| JP | 2005-141392 | | 6/2005 |
| JP | 2008-257287 | | 10/2008 |
| KR | 2009098500 | A | 9/2009 |
| WO | WO2009014868 | | 1/2009 |

OTHER PUBLICATIONS

Mohanty-et al.; "A Hierarchical Approach for Energy Efficient Application Design Using Heterogeneous Embedded Systems"; pp. 243-255; Oct.-Nov. 2003.

Von Behren-et al.; "Capriccio: Scalable Threads for Internet Services"; ACM Digital Library; pp. 268-280; Oct. 2003.

Foong-et al.; "Architectural Characterization of Processor Affinity in Network Processing"; IEEE; 2005.

Milton, Scott; "Thread Migration in Distributed Memory Multicomputers", The Australian National University, Joint Computer Science Technical Report Senes, Feb. 1998.

Abdel-Shafi, et al.; "Efficient User-Level Thread Migration and Checkpointing on Windows NT Clusters", Proceedings of The 3rd USENIX Windows NT Symposium, Jul. 12-13, 1999.

Tullsen, et al. "Handling Long-latency Loads in a Simultaneous Multithreading Processor," IEEE, 2001, pp. 318-327.

Purser, et al. "A Study of Slipstream Processors," IEEE, 2000, pp. 269-280.

Choi et al. "Deterministic Replay of Java Multithreaded Applications," ACM SIGMETRICS Sympoisum on Parallel and Distributed (SPDT), Aug. 1998, pp. 48-59.

Alkalaj, et al. "Performance of Multi-Threaded Execution in a Shared-Memory Multiprocessor," IEEE, 1991, p. 330-333.

IBM, "Pacing support for Time Based Context Sampling," ip.com, Jan. 22, 2009.

Harkema, et al. Performance Monitoring of Java Applications, Jul. 2002.

Alexander, et al. A unifying approach to performance analysis in the Java environment, IBM Systems Journal, vol. 39, No. 1, 2000.

IBM, "Process and Thread Sampling—Target Selection in Interrupt Mode," Ip.com, Jul. 16, 2008.

Cao, Zhongbo, et al., "A Study of Java Virtual Machine Scalability Issues on SMP Systems," IEEE, Proceedings of the 2005 IEEE International Symposium on Workload Characterization, Oct. 6-8, 2005, pp. 119-128.

Chen, Liang, et al., "Resource Allocation in a Middleware for Streaming Data," Middleware 2004 Companion, 2nd Workshop on Middleware for Grid Computing, ACM, 2004, pp. 5-10.

Korochkin, Dmitry, et al., "Experimental Performance Analysis of the Ada95 and Java Parallel Program on SMP Systems," SIGAda'02, Dec. 8-12, 2002, ACM, pp. 53-56.

Tam, David, et al., "Thread Clustering: Sharing-Aware Scheduling on SMP-CMP-SMT Multiprocessors," EuroSys'07. Mar. 21-23, 2007, pp. 47-58.

International Search Report and Written Opinion dated Sep. 3, 2010 for International Application No. PCT/EP2010/058486, 8 pages.

U.S. Appl. No. 11/834,779, 1 page.

Whaley, John. "A Portable Sampling-Based Profiler for Java Virtual Machines," Proceedings of the ACM 2000 Java Grande Conference, Jun. 3, 2000, pp. 76-87.

International Search Report and Written Opinion for PCT/EP2011/057574 dated Aug. 2, 2011.

U.S. Appl. No. 11/549,609, filed Oct. 13, 2006 by A.R. Daherkar et al., Total 3 pp.

U.S. Appl. No. 12/824,217, filed Jun. 27, 2010 by F.E. Levine, Total 2 pp.

U.S. Appl. No. 11/549,613, filed Oct. 13, 2006 by A.R. Daherkar et al., Total 3 pp.

U.S. Appl. No. 12/786,381, filed May 24, 2010 by K.G. Kuiper et al., Total 2 pp.

U.S. Appl. No. 12/813,706, filed Jun. 11, 2010 by S.T. Jones et al., Total 3 pp.

U.S. Appl. No. 12/494,469, filed Jun. 30, 2009 by K.G. Kuiper et al., Total 4 pp.

U.S. Appl. No. 11/536,962, filed Sep. 29, 2006 by E.N. Herness et al., Total 1 p.

U.S. Appl. No. 11/536,941, filed Sep. 29, 2006 by E.N. Herness et al., Total 2 pp.

Mansouri-Samani, M. and M. Sloman, "A Configurable Even Service for Distributed Systems", © 1996 IEEE, Total 8 pp.

Meyer, K., B. Gas, and J. Doughty, "The Devolution of Functional Analysis", Oct. 26, 1982, Total 26 pp.

Rinard, M.C. and P.C. Diniz, "Eliminating Synchronization Bottlenecks Using Adaptive Replication", © 2003 ACM, ACM Transactions on Programming Languages and Sysems, vol. 25, Nol. 3, May 2003, pp. 316-359. [Also, Total 44 pp.].

Tidwell, D., J. Snell, and P. Kulchenko, "Programming Web Services with SOAP", O'Reilly, First Edition Dec. 2001, ISBN: 0-596-00095-2, 216 pages, Total 225 pp.

Websphere 6.0.2, "Processing Events in a Sequence", IBM, [online], [Retrieved on May 12, 2011]. Retrieved from the Internet at <URL: http://publib.boulder.ibm.com/infocenter/dmndhelp/v6rxmx/topic/com.ibm.wbithelp.wirin...>, Oct. 7, 2005, Total 9 pp.

Office Action 1, Sep. 19, 2012, for U.S. Appl. No. 12/786,381, filed May 24, 2010 by K.G. Kuiper et al., Total 28 pp.

Amendment 1, Sep. 25, 2012, for U.S. Appl. No. 12/494,469, filed Jun. 30, 2009 by K.G. Kuiper et al., Total 15 pp.

Amendment 1, Dec. 27, 2012, for U.S. Appl. No. 12/786,381, filed May 24, 2010 by K.G. Kuiper et al., Total 11 pp.

Amendment 2, Jan. 3, 2013, for U.S. Appl. No. 12/494,469, filed Jun. 30, 2009 by K.G. Kuiper et al., Total 12 pp.

(56) References Cited

OTHER PUBLICATIONS

Notice of Allowance 1, Jan. 17, 2013, for U.S. Appl. No. 12/494,469, filed Jun. 30, 2009 by K.G. Kuiper et al., Total 7 pp.
Amendment 1, Jan. 18, 2013, for U.S. Appl. No. 12/824,217, filed Jun. 27, 2010 by F.E. Levine, Total 11 pp.
Office Action 1, Oct. 18, 2012, for U.S. Appl. No. 12/824,217, filed Jun. 27, 2010 by F.E. Levine, Total 23 pp.
Final Office Action 1, Jun. 14, 2012, for U.S. Appl. No. 12/173,047, filed Jul. 15, 2008 by K.G. Kuiper et al., Total 22 pp.
Response to Final Office Action 1, Sep. 14, 2012, for U.S. Appl. No. 12/173,047, filed Jul. 15, 2008 by K. G. Kuiper et al., Total 19 pp.
Final Office Action 1, Nov. 6, 2012, for U.S. Appl. No. 12/494,469, filed Jun. 30, 2009 by K.G. Kuiper et al., Total 10 pp.
Arpaci-Dusseau, Andrea Carol, "Implicit Coscheduling: Coordinated Scheduling with Implicit Information in Distributed Systems", ACM Transactions on Computer Systems, vol. 19, No. 3, Aug. 2011, pp. 283-331 [Also Total 49 pp.].
Barcia, R. and J. Brent, "IBM WebSphere Developer Technical Journal: Building SOA Solutions with the Service Component Architecture—Part 1", Oct. 26, 2005, Total.
Cerami, Ethan, "Web Services Essentials", Feb. 2002, O'Reilly, First Edition, Total 286 pp.
Amendment 1, May 30, 2012, for U.S. Appl. No. 12/813,706, filed Jun. 11, 2010 by S.T. Jones et al., Total 11 pp.
Office Action 1, Mar. 2, 2012, for U.S. Appl. No. 12/813,706, filed Jun. 11, 2010 by S.T. Jones et al., Total 21 pp.
Notice of Allowance 1, Aug. 20, 2012, for U.S. Appl. No. 12/813,706, filed Jun. 11, 2010 by S.T. Jones et al., Total 8 pp.
Amendment 1, Nov. 13, 2008, for U.S. Appl. No. 11/536,962, filed Sep. 29, 2006 by E.N. Herness et al., Total 8 pp.
Amendment 2, Jan. 8, 2009, for U.S. Appl. No. 11/536,962, filed Sep. 29, 2006 by E.N. Herness et al., Total 18 pp.
Amendment 3, Aug. 11, 2009, for U.S. Appl. No. 11/536,962, filed Sep. 29, 2006 by E.N. Herness et al., Total 24 pp.
Amendment 4, Mar. 1, 2010, for U.S. Appl. No. 11/536,962, filed Sep. 29, 2006 by E.N. Herness et al., Total 22 pp.
Amendment 5, Aug. 19, 2010, for U.S. Appl. No. 11/536,962, filed Sep. 29, 2006 by E.N. Herness et al., Total 11 pp.
Final Office Action 1, May 14, 2009, for U.S. Appl. No. 11/536,962, filed Sep. 29, 2006 by E.N. Herness et al., Total 42 pp.
Final Office Action 2, May 28, 2010, for U.S. Appl. No. 11/536,962, filed Sep. 29, 2006 by E.N. Herness et al., Total 49 pp.
Notice of Allowance 1, Sep. 7, 2010, for U.S. Appl. No. 11/536,962, filed Sep. 29, 2006 by E.N. Herness et al., Total 24 pp.
Notice of Allowance 2, Nov. 23, 2010, for U.S. Appl. No. 11/536,962, filed Sep. 29, 2006 by E.N. Herness et al., Total 27 pp.
Office Action 1, Oct. 27, 2008, for U.S. Appl. No. 11/536,962, filed Sep. 29, 2006 by E.N. Herness et al., Total 11 pp.
Office Action 2, Dec. 24, 2008, for U.S. Appl. No. 11/536,962, filed Sep. 29, 2006 by E.N. Herness et al., Total 8 pp.
Office Action 3, Dec. 1, 2009, for U.S. Appl. No. 11/536,962, filed Sep. 29, 2006 by E.N. Herness et al., Total 39 pp.
Amendment 1, Dec. 8, 2008, for U.S. Appl. No. 11/536,941, filed Sep. 29, 2006 by E.N. Herness et al., Total 7 pp.
Amendment 2, Apr. 13, 2009, for U.S. Appl. No. 11/536,941, filed Sep. 29, 2006 by E.N. Herness et al., Total 9 pp.
Notice of Allowance 1, Jan. 14, 2009, for U.S. Appl. No. 11/536,941, filed Sep. 29, 2006 by E.N. Herness et al., Total 9 pp.
Notice of Allowance 2, May 15, 2009, for U.S. Appl. No. 11/536,941, filed Sep. 29, 2006 by E.N. Herness et al., Total 11 pp.
Notice of Allowance 3, Jun. 22, 2009, for U.S. Appl. No. 11/536,941, filed Sep. 29, 2006 by E.N. Herness et al., Total 10 pp.
Office Action 1, Nov. 14, 2008, for U.S. Appl. No. 11/536,941, filed Sep. 29, 2006 by E.N. Herness et al., Total 18 pp.
Office Action 1, Feb. 17, 2011, for U.S. Appl. No. 11/834,779, filed Aug. 7, 2007 by K.G. Kuiper et al., Total 38 pp.
Final Office Action 1, Jul. 15, 2011, for U.S. Appl. No. 11/834,779, filed Aug. 7, 2007 by K.G. Kuiper et al., Total 17 pp.
Notice of Allowance 1, Oct. 25, 2011, for U.S. Appl. No. 11/834,779, filed Aug. 7, 2007 by K.G. Kuiper et al., Total 51 pp.
Response to Office Action 1, May 17, 2011, for U.S. Appl. No. 11/834,779, filed Aug. 7, 2007 by K.G. Kuiper et al., Total 13 pp.
Response to Final Office Action 1, Oct. 17, 2011, for U.S. Appl. No. 11/834,779, filed Aug. 7, 2007 by K. G. Kuiper et al., Total 8 pp.
Office Action 1, Nov. 21, 2011, for U.S. Appl. No. 12/173,047, filed Jul. 15, 2008 by K.G. Kuiper et al., Total 19 pp.
Response to Office Action 1, Feb. 20, 2012, for U.S. Appl. No. 12/173,047, filed Jul. 15, 2008 by K.G. Kuiper et al., Total 17 pp.
Office Action 1, Jun. 27, 2012, for U.S. Appl. No. 12/494,469, filed Jun. 30, 2009 by K.G. Kuiper et al., Total 21 pp.
Final Office Action 1, Apr. 3, 2013, for U.S. Appl. No. 12/786,381, filed May 24, 2010 by K.G. Kuiper et al., Total 55 pp.
U.S. Appl. No. 12/824,217, filed Sep. 29, 2006 by E.N. Herness et al., Total 3 pp.
U.S. Appl. No. 12/786,381, filed May 24, 2010 by K.G. Kuiper et al., Total 4 pp.
U.S. Appl. No. 11/834,779, filed Aug. 7, 2007 by K. G. Kuiper et al., Total 2 pp.
U.S. Appl. No. 12/173,047, filed Jul. 15, 2008 by K.G. Kuiper et al., Total 2 pp.
U.S. Appl. No. 12/813,706, filed Jun. 11, 2010 by S.T. Jones et al., Total 4 pp.
Notice of Allowance 2, May 24, 2013, for U.S. Appl. No. 12/813,706, filed Jun. 11, 2010 by S.T. Jones et al., Total 14 pp.
Office Action, Apr. 25, 2013, for U.S. Appl. No. 12/173,047, filed Jul. 15, 2008 by K.G. Kuiper et al., Total 45 pp.
Final Office Action 1, Mar. 20, 2013, for U.S. Appl. No. 12/824,217, filed Jun. 27, 2010 by F.E. Levine, Total 35 pp.
Amendment 2, Jun. 19, 2013, for U.S. Appl. No. 12/824,217, filed Jun. 27, 2010 by F.E. Levine, Total 12 pp.
Amendment 2, Jul. 3, 2013, for U.S. Appl. No. 12/786,381, filed May 24, 2010 by K.G. Kuiper et al., Total 9 pp.
Response to Office Action, Jul. 22, 2013, for U.S. Appl. No. 12/173,047, filed Jul. 15, 2008 by K.G. Kuiper et al., Total 12 pp.
Notice of Allowance 1, Aug. 28, 2013, for U.S. Appl. No. 12/786,381, filed May 24, 2010 by K.G. Kuiper et al., Total 17 pp.
Notice of Allowance 1 for U.S. Appl. No. 12/173,047, dated Sep. 11, 2013, 22 pp.
Notice of Allowance 1 for U.S. Appl. No. 12/824,217, dated Sep. 27, 2013, 20 pp.
Notice of Allowance 3 for U.S. Appl. No. 12/813,706, dated Sep. 13, 2013, 11 pp.
Office Action 1 for CN Application No. 201080010002.9, dated Sep. 4, 2013, 9 pp.
Notice of Allowance, dated Nov. 12, 2013, for U.S. Appl. No. 12/494,469, filed on Jun. 30, 2009, 14 pp.
US Patent No. 7,458,078, dated Nov. 25, 2008, is an English language equivalent of CN1614555, dated May 11, 2005.
US Publication No. 2005/0102673, dated May 12, 2005, is an English language equivalent of CN1614555, dated May 11, 2005.
Amendment 3, Mar. 18, 2014, for U.S. Appl. No. 12/786,381, filed on May 24, 2010 by K.G. Kuiper et al., Total 9 pp.
Corrected Notice of Allowability, Apr. 7, 2014, for U.S. Appl. No. 12/824,217, filed on Jun. 27, 2010 by F.E. Levine, Total 9 pp.
AIX Versions 3.2 and 4 Performance Tuning Guide, Performance Overview of the Virtual Memory Manager (VMM), Apr. 1997 http://nfosolutions.com/doc_link/C/a_doc_lib/aixbman/prftungd/vm-mov.htm, 8 pp.
Binder, "Portable and Accurate Sampling Profiling for Java", Software-Practice and Experience, vol. 36, Issue 6, May 2006, pp. 615-650.
Chanda et al., "Whodunit: Transactional Profiling for Multi-Tier Applications", ACM, EuroSys'07, Mar. 2007 Lisboa, Portugal, pp. 17-30.
Dunlavey, "Performance Tuning with Instruction-Level Cost Derived from Call-Stack Sampling", ACM SIGPLAN Notices, vol. 42(8), Aug. 2007, pp. 4-8.
Froyd et al., "Low-Overhead Call Path Profiling of Unmodified, Optimized Code", ACM, ICS'05 Cambridge, Massachusetts, pp. 81-90.
Graham, et al., "gprof: a Call Graph Execution Profiler," Proceedings of the 1982 SIGPLAN Symposium on Compiler Construction, Jun. 1982m pp. 120-126.

(56) References Cited

OTHER PUBLICATIONS

Sun Java Real-Time System 2.0_01, Garbage Collection Guide, Nov. 21, 2007 http://download.oracle.com/javase/realtime/doc_2.0_u1/release/JavaRTSGarbageCollection.html, 12 pp.
Supplemental Notice of Allowance 1, dated Nov. 19, 2013, for U.S. Appl. No. 12/824,217, 6 pp.
Notice of Allowance 2, dated Dec. 19, 2013, for U.S. Appl. No. 12/786,381, 10 pp.
Response to Examination Report for GB Applicaion No. 1212738.7, dated Dec. 11, 2013, 7 pp.
Notice of Allowance 4, dated Jan. 17, 2014, for U.S. Appl. No. 12/813,706, 13 pp.
Office Action 1, dated Dec. 19, 2011, for U.S. Appl. No. 12/173,053, 15 pp.
Response to Office Action 1, dated Mar. 19, 2012, for U.S. Appl. No. 12/173,053, 17 pp.
Notice of Allowance, dated Nov. 20, 2013, for U.S. Appl. No. 12/173,047, 35 pp.
Final Office Action 1, dated May 2, 2012, for U.S. Appl. No. 12/173,053, 16 pp.
Appeal Brief, dated Jul. 23, 2012, for U.S. Appl. No. 12/173,053, 23 pp.
Notice of Allowance, dated Jun. 13, 2013, for U.S. Appl. No. 12/173,053, 13 pp.
Office Action 1, dated Jan. 5, 2012, for U.S. Appl. No. 12/173,107, 21 pp.
Response to Office Action 1, dated Mar. 30, 2012, for U.S. Appl. No. 12/173,107, 15 pp.
Notice of Allowance, dated Jun. 6, 2012, for U.S. Appl. No. 12/173,107, 10 pp.
Office Action 1, dated Feb. 2, 2011, for U.S. Appl. No. 12/235,302, 16 pp.
Response to Office Action 1, dated Apr. 20, 2011, for U.S. Appl. No. 12/235,302, 24 pp.
Final Office Action 1, dated Jul. 20, 2011, for U.S. Appl. No. 12/235,302, 17 pp.
Appeal Brief, dated Dec. 13, 2011, for U.S. Appl. No. 12/235,302, 35 pp.
Examiner's Answer, dated Feb. 27, 2012, for U.S. Appl. No. 12/235,302, 20 pp.
Reply Brief, dated Apr. 27, 2012, for U.S. Appl. No. 12/235,302, 5 pp.
Notice of Allowance 2, dated Feb. 14, 2014, for U.S. Appl. No. 12/824,217, 21 pp.
U.S. Patent No. 6,002,872, dated Dec. 14, 1999, is an English language equivalent of JP11-327951, dated Nov. 30, 1999.
US Patent No. 7,284,238, dated Oct. 16, 2007, is an English language equivalent of JP2004-199330, dated Jul. 15, 2004.
Machine Translation of JP Publication No. 2002-055848, dated Feb. 20, 2002, 23 pp.
Machine Translation of JP Publication No. 2005-055848, dated Jun. 2, 2005, 18 pp.
Machine Translation of JP Publication No. 2008-257287, dated Oct. 23, 2008, 32 pp.
Office Action 3, Apr. 14, 2014, for U.S. Appl. No. 12/786,381, filed May 24, 2010 by K.G. Kuiper et al., Total 16 pp.
Notice of Allowance 5, Apr. 24, 2014, for U.S. Appl. No. 12/813,706, filed Jun. 11, 2010 by S.T. Jones et al., Total 10 pp.
Corrected Notice of Allowability, Apr. 25, 2014, for U.S. Appl. No. 12/824,217, filed Jun. 27, 2010 by F.E. Levine, Total 7 pp.
US 8,589,928, 11/2013, Kuiper et al. (withdrawn)

* cited by examiner

SCALABLE SYSTEM CALL STACK SAMPLING

BACKGROUND

1. Field

This invention generally relates to a computing environment. More particularly, the invention relates to sampling technology.

2. General Background

Either time-based or hardware event-based sampling technology is typically utilized in application profiling tools to determine the specific usage of resources. A current approach is to sample by periodically generating interrupts. At each interrupt the current process/thread, the instruction being executed and, optionally, the data address being accessed, may be identified and recorded. At a later time, the collected data is aggregated, and reports are generated showing sample distribution by address, symbol, process, etc. A variety of tools are based on this technology. The full execution context of the sample is not typically recorded and not available in reports.

Attempts have been made to improve this technology by getting call stacks at the time of the sample. The existing set of tools may either attempt to walk the call stack directly or invoke functions on a separate (sampler) thread to obtain the call stack of the interrupted thread. The call stack of the interrupted thread is walked into a tree, and a counter in the leaf node of the call stack collected is incremented. Reports are generated that indicate the number of occurrences or samples of the call stacks and the accumulated samples representing the time spent in the methods or functions called by the reported method or function.

In the case of busy or executing threads, the simple approach of identifying time spent where busy has proven to be valuable and scalable. A determination is made as to where the processor is spending time and the path for getting there. At any instance of time, at most only one thread executes on a given processor. Accordingly, sampling the currently executing threads is limited to at most one per processor per sample. Providing reports for these busy threads via sampling and finding ways to reduce the code paths has helped improve performance.

However, trying to figure out bottlenecks or why workloads are not scaling may involve hundreds or thousands of threads that are not executing. Getting information on all threads or all threads that are not executing may involve a significant amount of time. Simply taking a dump of all threads for an application may provide insight into causes of scalability problems. However, getting a full application thread dump typically is done by stopping the application and taking a snapshot of the application. Getting a full application thread dump is clearly not suitable for analysis in a production environment. Also, a given thread dump may not give insight into a given bottleneck.

SUMMARY

Method, system and computer program product embodiments of the invention are provided for multi-threading by generating an interrupt based on an event, selecting a thread for monitoring, capturing information, with an interrupt handler, for a monitored thread, setting an affinity of the monitored thread such that the monitored thread runs only on a current processor without being able to migrate to a different processor, and retrieving, with a sampler thread that runs on the current processor, a call stack associated with a monitored thread after the affinity of the monitored thread has been set to the current processor.

DRAWINGS

The above-mentioned features of the present invention will become more apparent with reference to the following description taken in conjunction with the accompanying drawings wherein like reference numerals denote like elements and in which.

DETAILED DESCRIPTION

With the increase in Web applications that support the processing of requests from many client machines, analysis and resolution of the causes of bottlenecks where requests are not being processed as quickly as needed are helpful. Performance bottlenecks may have various causes. For example, the root cause of a bottleneck may be caused by a resource not being available to allow the required work to continue. For instance, a thread may be waiting for input/output ("I/O") to complete or for some other resource to become available. In a common case, access to an internal data structure that is currently being locked for access by another thread may be helpful. Further, one or more threads that are not currently being executed may need to perform some work to meet the demands of the work loads. These conditions may occur even when processors are available to perform additional work, i.e., when processors are not being used or "idle." With computer hardware adding more processing cores, utilization of the cores when needed to meet workload demands may be helpful. The computer program product, process, and system provided herein help identify bottlenecks during performance analysis. Call stack (thread dump) information, which includes threads that are not executing with a minimal impact to operations, is obtained.

For many workloads and many environments, especially for client/server or transaction based services, the transaction rate may be brought to a steady state such that basically the same general activity is executed repeatedly. In these types of environments, obtaining accurate, preferably random snapshots of all threads or all important threads, can provide valuable insight into the operation of the system and insight into the causes of bottlenecks. The snapshots should avoid misrepresenting the states by collecting information that is biased. Information can be biased for a thread state if the thread is allowed to execute while the state is being collected.

In order to prevent or detect this, the execution of a thread for which its execution state or call stack is collected is minimized or eliminated. In one embodiment, states for either all threads or at least the threads that affect the transaction rate are collected. Accurate information is collected for as many threads as is needed in a scalable manner.

In one embodiment, a thread for call stack collection is periodically selected via accurate call stack sampling regardless of the state of the processor or the thread. Various approaches may be utilized to select the thread for call stack retrieval and recording.

Efficient, yet randomized, profiling to facilitate providing reports that give insights into application contexts that include both threads that are executing and threads that are not executing is provided herein. A thread is periodically selected for call stack sampling so that over time all threads of interest are monitored and their call stacks retrieved via unbiased call stack sampling. In one embodiment, all threads of interest are rotated through. The next thread is selected in sequence on each sample. According to an embodiment of the present invention, a sampling configuration is provided that provides an insight into the state of threads that may or may not be currently executing. This sampling may occur on all processors regardless of whether a processor is busy executing or idle, that is, not doing useful work. Each processor is configured to generate an interrupt when either an elapsed time occurs or some number of events has occurred since the last interrupt. These events may be supported by a processor performance monitor component that signals an interrupt when a performance monitor counter overflows. The counters are programmed to overflow when a specified number of events, such as, completed instructions or cycles has occurred. When the interrupt is taken, the interrupt handler may choose one or more threads for call stack retrieval. Since the overhead related to retrieving a single call stack may be considerable and the ability to choose more than one thread may be done via repeating the approach to getting one call stack, the methodology provided herein assumes that only one thread is selected at each sample. The interrupt handler captures information regarding the interrupted thread at the time of the interrupt (interrupted process, thread, instruction) which indicates whether or not the processor is busy at the time of the interrupt. Further, the interrupt handler may also capture information regarding the thread selected for call stack sampling. Depending on what is being profiled, information regarding the thread and the processor is collected and placed in a mapped data area for access by the sampler thread. Many different approaches can be used to choose a thread for call stack sampling. In one embodiment, the round robin approach that selects the next thread in a list of threads is utilized. The thread chosen may be restricted to only threads that have last run on the current processor. This round robin approach ensures that all threads in the list of threads will get their call stacks retrieved with additional samples taken for each thread as the rate of samples and elapsed sampling time allow. Restricting the choice to threads which have last run on the current processor may give better sampling performance as the thread's instructions may be still be in the processor cache. Alternatively, the thread may be chosen at random from the list of candidate threads. The operating system or a device driver can monitor thread dispatches for each processor and keep track of where threads have last executed. In one embodiment, a thread is chosen at random for monitoring and its call stack is gathered at each sample. In another embodiment, a weighted approach is used to choose the thread for monitoring, where busier threads are given a higher likelihood of being chosen. Also, more selectivity may be used, such as, only choosing threads where specific method(s) have been executed. This may be done by selectively enabling entry/exit events for the specific method(s). Alternatively, call stacks may be retrieved for busy threads and a determination made if the method(s) were in the retrieved call stacks. The threads may be chosen by a thread naming criteria. In any case, once a thread is chosen for sampling, the call stack sample should be as representative as possible as to the time when the determination is made. If the selected thread is allowed to freely execute before the call stack is retrieved, then the call stack returned will not reflect the state at the time the choice is made. Accurate call stack retrieval may be ensured regardless of whether or not the chosen thread was executing at the time of the interrupt.

A profile for monitored threads is collected by walking each call stack into a tree and incrementing one or more counters of the leaf node of the call stack associated with the state of the thread or processor at the time of the interrupt. The collected profile may indicate which threads are executing, not executing, processor busy, or processor not busy for each sample taken.

As a result, a determination may be made as to how functions were called in all threads regardless of whether the thread or the processor is executing at the time the interrupt is signaled. Further, a determination may be made as to the call stack or calling sequence that was utilized to invoke a particular function. Such a determination may help an analyst determine if a problem exists with how a particular function is being invoked, what calling sequence is being utilized the most frequently, and whether the calling sequence is necessary. In one embodiment, a report may be generated to show the different ways in which a function was called.

In gathering calls stacks for monitored threads, there is a migration issue. This may occur regardless of whether the monitored thread was executing at the time of the interrupt. That is, while the call stacks are gathered, the thread may have migrated to a different processor or started processing on a different processor. Thread migration may be prevented by keeping all processors busy, other than the one on which the call stack will be gathered. This may be accomplished by having sampler threads spin on those processors, until the call stack is obtained for the thread of interest. However, this severely affects overall application performance. Instead, the thread of interest may be prevented from migrating to a different processor by setting its affinity to restrict it to running on only one processor. In this way the other processors do not have to be spun, so that the other processors are free to continue running the application. Thus, there is minimal application performance degradation. Accordingly, thread migration is prevented by setting the processor affinity of the monitored thread to allow it to run only on the current processor.

After the call stack is retrieved, the monitored thread's original affinity is restored. Setting a thread's affinity, which may be referred to as binding, causes the thread to run only on the specified processor(s). Since the sampler thread runs at high priority and on the same processor on which the monitored thread is intended to run, the monitored thread may not migrate to a different processor.

In the case of a monitored thread that is chosen but is not currently executing, another embodiment of the present invention may identify the current instruction and stack pointer of the monitored thread, gather its call stack, and then see if the instruction pointer and stack pointer have changed. If they have changed, then the sample is discarded. If they have not changed, then the sample is recorded and used. This approach may reduce system impact for the chosen threads that have not been executed for some time and are unlikely to start executing during the call stack retrieval.

Figure 1:
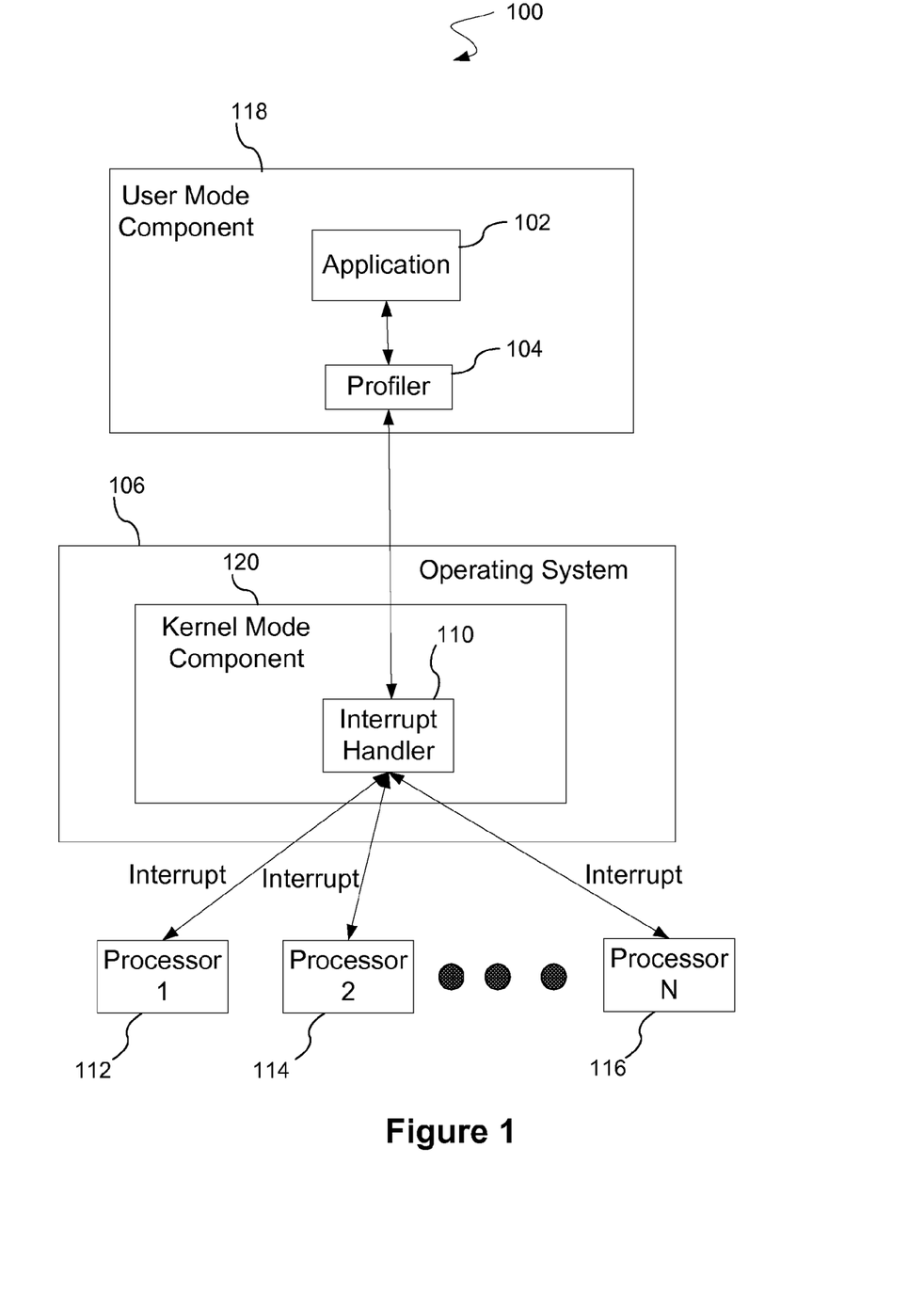
FIG. 1 illustrates a sampling system 100 according to an embodiment of the present invention.

FIG. 1 illustrates a sampling system 100 according to an embodiment of the present invention. The sampling system 100 includes a user mode component 118 that has an application 102 that interacts with a profiler 104 that profiles the application 102. The profiler 104 interacts with an operating system 106, which includes a kernel mode component 120. The kernel mode component 120 may include an interrupt handler 110. The kernel mode component 120 may also be a kernel extension. Further, the kernel mode component 120 may be a part of a device driver installed in the sampling system 100. The device driver extends the functionality of the kernel component 120. The location of the code and the calling sequence that led to the code being there is determined.

Sampler threads are listening for commands to cause them to retrieve the call stack of a thread of interest, which is performed by the profiler 104. A sampler thread is a profiler thread. Each sampler thread has an affinity to a single processor. Sampler threads may be very high priority threads so that they run immediately when signaled to do work such as retrieving a call stack of a monitored thread. The monitored thread is the thread that has the call stack of interest to be obtained. Further, a target processor is the processor on which the monitored thread was either running or preferably on which it last ran and on which its affinity is set so that the monitored thread remains on that processor during the time the call stack of the monitored thread is gathered.

As samples are processed, the kernel mode component 120 handling the interrupt may be able to set the monitored thread's affinity immediately within the interrupt handler 110. In one embodiment, setting the affinity may occur outside the interrupt handler when interrupts are enabled. For example, a second level interrupt handler ("SLIH") or an interrupt back-end may perform this action. While handling the samples, e.g., interrupts, if the monitored thread is the interrupted thread, the monitored thread may not make forward progress until the SLIH or the interrupt back-end has completed its processing, which may include scheduling the sampling thread(s) for the interrupted process. If the monitored thread is not the interrupted thread and was last executed on the current processor, then the monitored thread is not executing at the time of the interrupt and is unlikely to start executing on another processor during the time of the interrupt processing. If the monitored thread does start executing on a different processor, then the condition can be detected and the sample invalidated.

In an alternative embodiment, all user-mode sampler threads, one for each processor, may spin until the monitored thread's affinity is set. This method may be used if the operating system's support for binding or setting a thread's affinity is only supported from user mode. In another embodiment, the monitored thread is suspended either in the interrupt handler or in an interrupt back-end. Once the sampler thread gets control, it will set the monitored thread's affinity and resume, i.e., un-suspend it. In yet another embodiment, the profiler installs a global signal handler for the application being profiled. At interrupt time, the interrupt handler signals the monitored thread using a predefined signal, which causes the signal handler to run in the context of the monitored thread. The signal handler then sets the processor affinity of the monitored thread, in which context it is executing, to the current processor. Subsequently, the signal handler signals the sampler thread on the current processor. The sampler runs after the signal handler signals the sampler thread.

Once a determination is made as a result of sampling, a call stack of a monitored thread is to be obtained. The monitored thread is prevented from making any forward progress during that time. In other words, the monitored thread is kept where it is until the call stack is gathered. Afterward, the monitored thread may resume normal execution.

In a multi-processor environment, an issue arises in gathering calls stacks. That is, since call stacks are gathered by profiler sampler threads, the monitored thread may potentially be running on another available processor, i.e., a different processor than the target processor. By the time the sampler thread gathers the call stack, the monitored thread may no longer be at the point where it was sampled, and the call stack will not accurately reflect where the monitored thread was at the time of the sample. This issue may be addressed by boxing out all of the processors other than the target processor, i.e., giving all the other processors busy work that is not useful to make them spin so that they do not have the monitored thread. However, such an approach tends to significantly hinder application performance. So instead, the set of processors on which the monitored thread may run is restricted to the target processor, according to an embodiment of the present invention. In this way, the remaining processors may continue to perform real work. Only the target processor is affected while the call stack of the monitored thread is being retrieved. The affinity is set so that the monitored thread may run only on the one processor to which it has affinity. Once the call stack of the target processor is obtained, the affinity of the monitored thread is restored and the monitored thread may run on any available processor again.

The sampling system 100 may have a plurality of processors. For example, the sampling system 100 may have a first processor 112, a second processor 114, . . . , and an nth processor 116. Only one thread may run on each processor at a given time. However, that thread may potentially run on a different processor at a different time. In the sampling system 100, at least one processor generates an interrupt. In one embodiment, a sample may be driven by an interrupt. In one embodiment, the sample is based on an event. For example, the event may be time based so that the sample is generated at a constant rate for predetermined time intervals. Accordingly, each of the processors may generate an interrupt at a constant rate irrespective of the status of each of the processors, e.g., being idle or not being idle. The interrupt for each processor is generated by hardware and handled by an interrupt handler 110, which selects or identifies a thread for monitoring. The interrupt handler 110 initiates the gathering of call stacks. Further, the interrupt handler may notify or signal a profiler sampler thread. To avoid thread migration during sampling, the affinity of a thread to a particular processor may be established.

In another embodiment, a component such as an interrupt back-end worker, off-level processing worker, interrupt back-end worker, or the like may be utilized as only some things may be done at the interrupt level, and the rest of the work is deferred until a subsequent time.

The profiler 104 may retrieve the call stack, i.e., the execution context. Further, the profiler 104 may restore the affinity.

In one embodiment, the call stack sampling tool contains a kernel mode component 120 and a user mode component 118 that work together. In one configuration, the underlying operating system 106 provides application program interfaces ("APIs") that allow for setting a thread's affinity from kernel mode. The user mode component 118 creates a high priority sampling thread for each processor and sets its affinity to only that processor. Each sampler thread is responsible for gathering call stacks for one or more monitored threads. Each sampler thread waits for notification from the kernel mode component. The kernel mode component 120 enables the sampling, e.g., interrupt mechanism. Interrupts occur on each processor at a predetermined rate. The interrupt handler 110 handles the sampling interrupts. For example the interrupt handler 110 may perform the following: (1) select a thread for monitoring and collect the monitored thread's information, e.g., thread id, process id, user-mode and kernel-mode instruction and stack pointers, etc.); (2) set the monitored thread's affinity to only the processor on which the interrupt handler is running, e.g., the interrupted processor; (3) notify the user-mode sampler thread to collect the call stack; and (4) indicate that no more samples will be handled on this processor until the user-mode sampler thread completes. Further, the user-mode sampler thread wakes up and performs the following: (1) utilizes a virtual machine tools interface to obtain the monitored thread's call stack or walks the monitored thread's call stack directly; (2) restores the original monitored thread's affinity to allow for the operating system 106 as seen in FIG. 1 to schedule the monitored thread on any available processor; (3) save call stack and thread information; (4) notify the kernel mode component 120 that processing had completed; and (5) wait for the next kernel-mode notification. In addition, the kernel mode component 120 resets the sampling mechanism and waits for the next interrupt to continue with the kernel mode component 120 handling the sampling interrupts. As a result, setting a thread's affinity is a very fast and lightweight operation and the need to spin threads on other processors for the length of time it takes to collect the monitored thread's call stack is eliminated. Accordingly, those other processors are free to perform useful work.

In another configuration, the underlying operating system 106 as seen in FIG. 1 is assumed not to provide APIs that allow for setting a thread's affinity from kernel mode. The user mode component 118 creates a high priority sampling thread for each processor and sets its affinity to only that processor. Each sampler thread is responsible for gathering call stacks for one or more monitored threads that were last running in that processor. Each sampler thread waits for notification from the kernel mode component. Further, the kernel mode component 120 sets the sampling, e.g., interrupt mechanism. Interrupts will occur on each processor at a predetermined rate. In addition, the kernel mode component 120 handles the sampling interrupts. The kernel mode component 120 collects the monitored thread's information, e.g., thread id, process id, user-mode and kernel-mode instruction and stack pointers, etc. Further, the kernel mode component 120 notifies all user-mode sampler threads to wake up, but assigns the responsibility for collecting the call stack to only those samplers running on processors on which a monitored thread has been identified to have its call stack retrieved. The kernel mode component 120 indicates that no more samples will be handled on this processor until the user mode sampler thread completes. All user mode sampler threads wake up and the ones which were not responsible for collecting a call stack go into a spin loop to wait for the samplers tasked with collecting a call stack to set their monitored threads' affinity whereas the samplers with work to do, i.e., tasked with collecting call stacks, set the monitored thread's affinity to only the processor on which it was running, e.g., the interrupted processor, and join the spin until all monitored threads have had their affinity changed. Once all monitored threads have had their affinity changed, samplers which were not tasked with collecting a call stack stop spinning and go back to waiting for kernel-mode notification. Further, samplers tasked with collecting a call stack continue processing. In addition, samplers either request the monitored thread's call stack utilizing virtual machine tools interface APIs or retrieve the monitored thread's call stack directly. The original monitored thread's affinity is restored, which allows the operating system 106 to schedule the monitored thread on any available processor. Further, the call stack and thread information is saved. The kernel mode component 120 is notified that processing has completed. Samplers go back to waiting for the next kernel-mode notification. The kernel mode component 120 resets the sampling mechanism and waits for the next interrupt to continue with the kernel mode component 120 handling the sampling interrupts. As a result, setting a thread's affinity is a very fast and lightweight operation, and the length of time during which sampler threads on other processors need to spin is significantly reduced. The time is reduced from the length of time it takes to collect the monitored thread's call stack to the length of time needed to set affinity of the monitored threads. Once affinity is set, the spinning processors are free to perform useful work.

Variations of the configurations provided herein may be utilized to allow for collecting the call stacks asynchronously. Instead of making a synchronous call to a virtual machine tools interface to collect the call stack, a sampler may request that the call stack be collected for the monitored thread asynchronously, e.g., by setting a notification flag, at the next convenient time, and then wait for a notification from the virtual machine when the request is completed. At that time, the sampler would restore the monitored thread's affinity. Because collecting a call stack may be a lengthy operation, once the request is made to the virtual machine to collect the call stack, the sampler may yield the processor. The monitored thread will not migrate away from that processor. In order to get the call stack from the monitored thread as soon as possible, the sampler thread may increase the priority of the monitored thread and block after setting the notification flag. When the notification occurs, the profiler 104 retrieves and processes the call stack, before restoring the thread's original priority.

Figure 2:
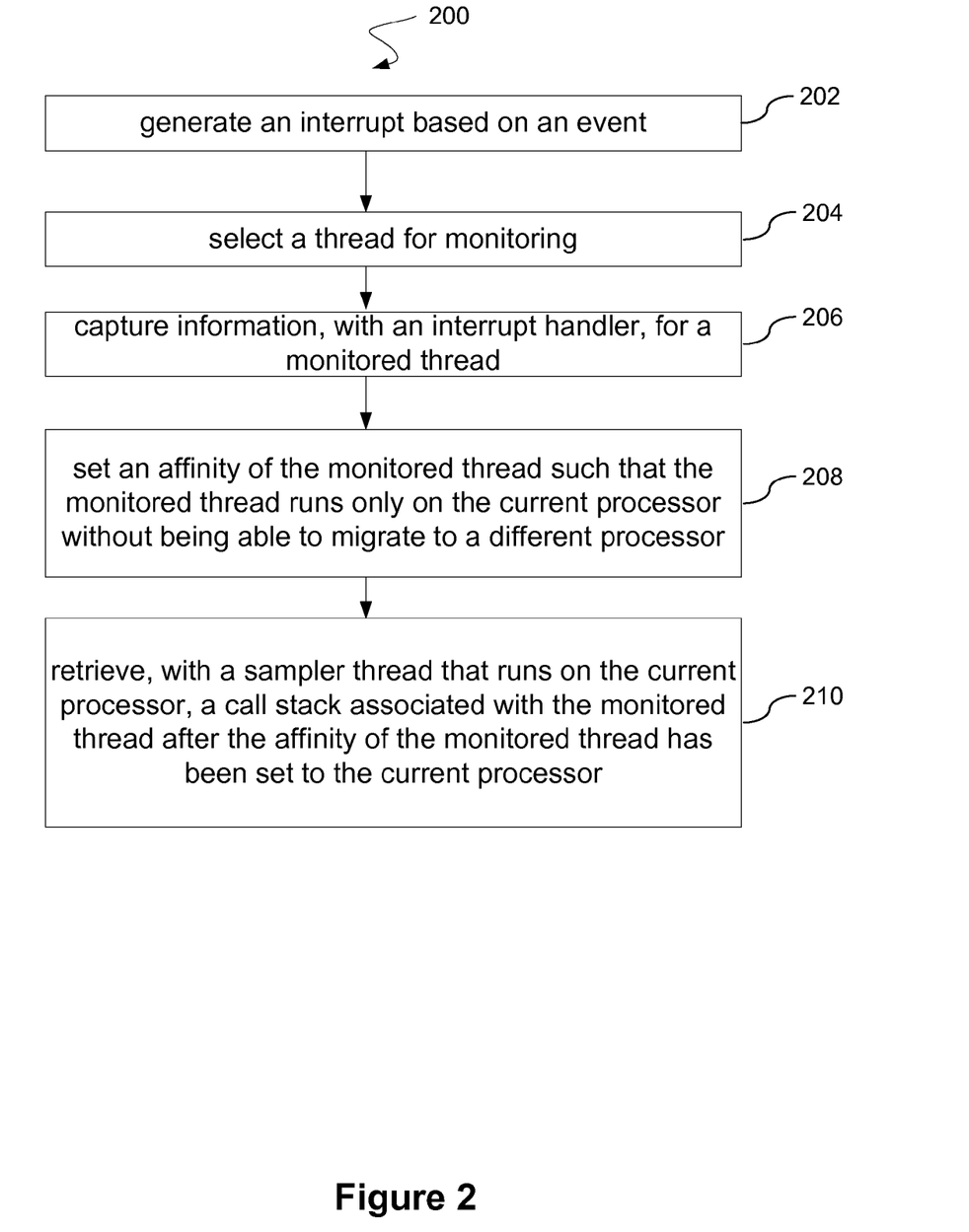
FIG. 2 illustrates a process 200 that may be utilized to sample a call stack and prevent thread migration according to an embodiment of the present invention.

FIG. 2 illustrates a process 200 that may be utilized to sample a call stack and prevent thread migration according to an embodiment of the present invention. At a process block 202, the process 200 generates an interrupt based on an event. Further, at a process block 204, the process 200 selects a thread for monitoring. In addition, at a process block 206, the process 200 captures information, with an interrupt handler, for the monitored thread on a current processor. The information may include the thread id ("TID"), process id ("PID"), kernel-mode and user-mode instruction pointer, and/or stack pointer. In addition, at a process block 208, the process 200 sets an affinity of the monitored thread such that the monitored thread runs only on the current processor without being able to migrate to a different processor. At a process block 210, the process 200 retrieves, with a sampler thread that runs on the current processor, a call stack associated with the monitored thread after the affinity of the monitored thread has been set to the current processor. In one embodiment, an affinity module (i) identifies a thread for monitoring that captures information, with an interrupt handler, for the monitored thread and (ii) sets an affinity of the monitored thread such that the monitored thread runs only on a current processor without being able to migrate to a different processor. Further, in another embodiment, the process 200 restores the affinity of the monitored thread after the call stack has been retrieved. The call stack may be recorded in the form of a report.

Figure 3:
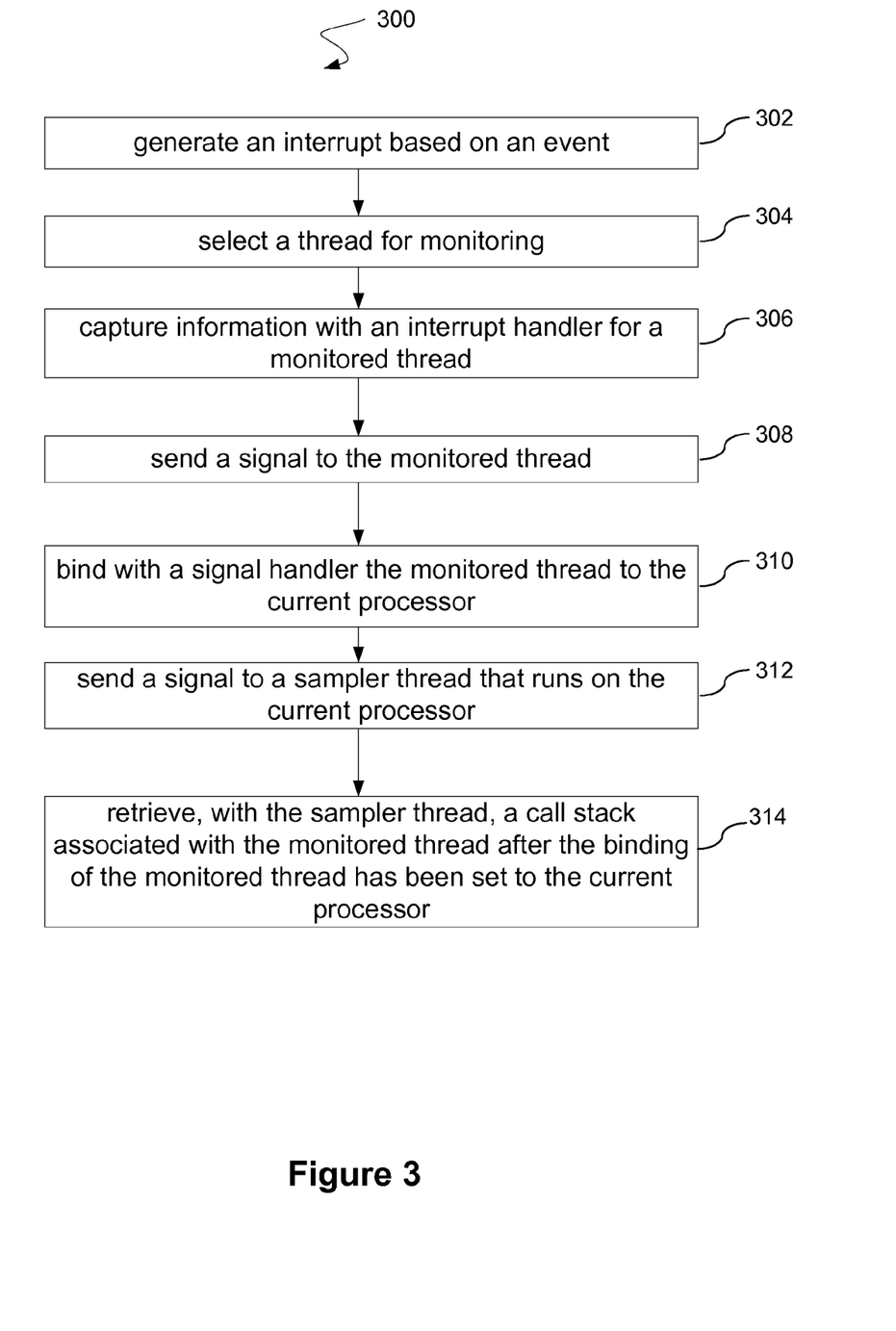
FIG. 3 illustrates a process 300 that may be utilized to utilize at least one signal to avoid forward progress when getting an interrupt driven call stack according to an embodiment of the present invention.

FIG. 3 illustrates a process 300 that may be utilized to avoid forward progress when getting an interrupt driven call stack according to an embodiment of the present invention. At a process block 302, the process 300 generates an interrupt based on an event. Further, at a process block 304, the process 300 selects a thread for monitoring. In addition, at a process block 306, the process 300 captures information, with an interrupt handler, for a monitored thread. In addition, at a process block 308, the process 300 sends a signal to the monitored thread. At a process block 310, the process 300 binds, with a signal handler, the monitored thread to the current processor. Further, at a process block 312, the process 300 sends a signal to a sampler thread that runs on the current processor. In addition, at a process block 314, the process 300 retrieves, with the sampler thread, a call stack associated with the monitored thread after the binding of the monitored thread has been set to the current processor. In one embodiment, the process 300 restores the binding of the monitored thread after the call stack has been retrieved.

In one embodiment, the signal handler is installed when the processing is registered for call stack sampling and its sampler threads are allocated. After the hardware is set up to generate one or more interrupts for the requested events, the interrupt is signaled and the interrupt handler handles the interrupt. The interrupt handler then chooses a thread for monitoring and signals the monitored thread, which may be effectuated by an SLIH or an interrupt back-end. The signal handler is then executed before the monitored thread is allowed to resume normal execution. The signal handler may then perform various actions to cause the monitored thread to be bound to the processor and allow the sampler thread to retrieve the call stack. In one embodiment, the signal handler binds, i.e., sets the affinity of the monitored thread to the interrupted processor and then signals the sampler thread for that processor to get the monitored thread's call stack. Since the signal handler may run on any processor, the monitored thread is bound to the correct processor, not necessarily the processor on which the signal handler is running. In one embodiment, the interrupt handler maintains a per-processor entry containing the monitored thread identifier. The signal handler searches the processor entry for its thread id and binds the thread to that processor. A variety of other configurations may be utilized.

When the sampler thread has determined that the monitored thread is bound to the interrupted processor, the sampler thread then requests or gets the call stack. In one embodiment, the sampler thread may set the affinity or know that the affinity was set by the signal handler.

With respect to native call stacks, one approach is to have the monitored application link with a library that supports the registration of monitoring and the installation of a signal handler. Alternatively, support may be added dynamically for an interrupted process. Although this may not be possible on the first interrupt, a daemon process may be scheduled to initiate the attachment in an expedited manner for subsequent interrupts against that process to be handled.

Figure 4:
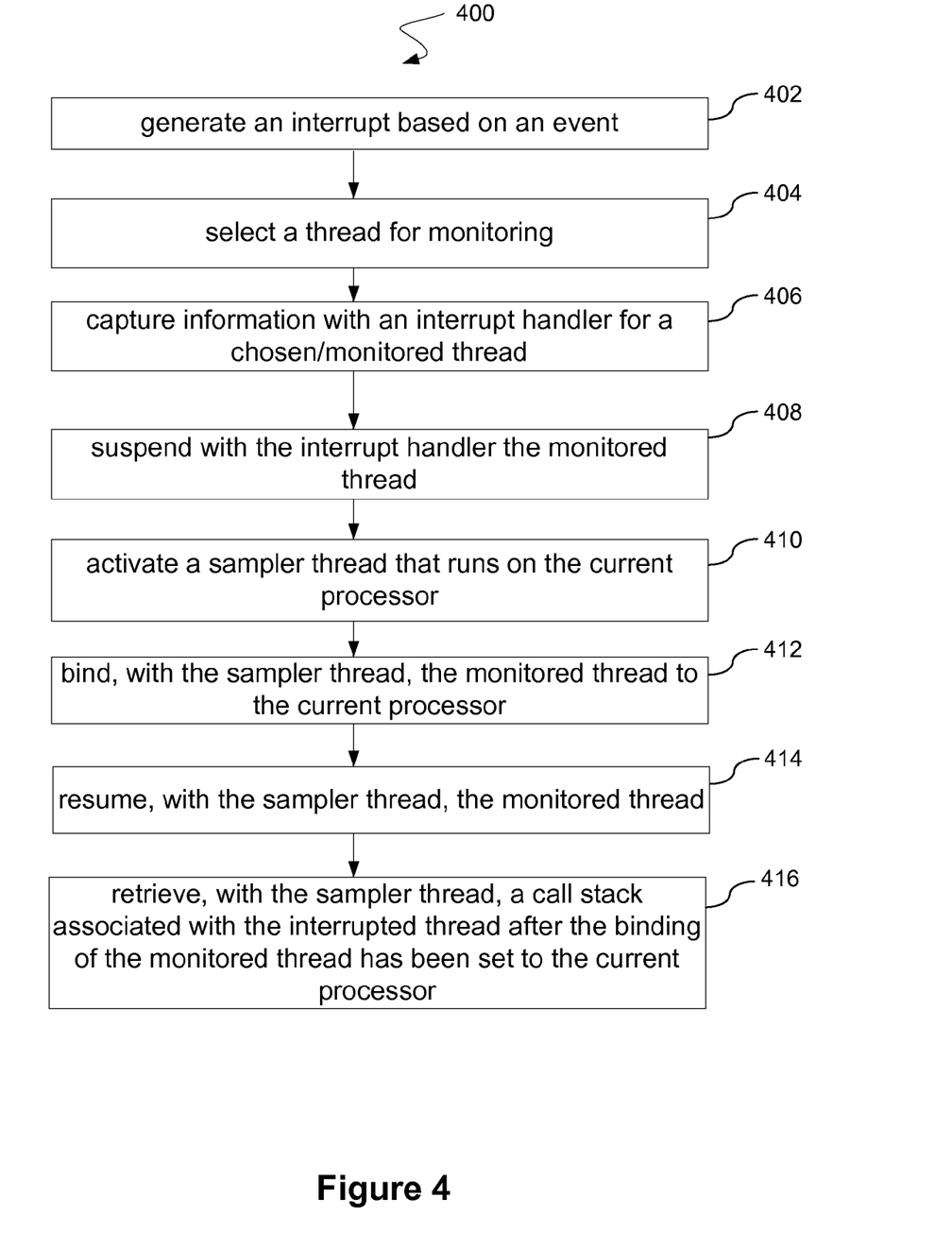
FIG. 4 illustrates a process 400 that suspends a thread until its processor affinity may be set to avoid forward progress when getting a call stack according to an embodiment of the present invention.

FIG. 4 illustrates a process 400 that suspends a thread until its processor affinity may be set to reduce forward progress when getting a call stack according to an embodiment of the present invention. At a process block 402, the process 400 generates an interrupt based on an event. Further, at a process block 404, the process 400 selects a thread for monitoring. In addition, at a process block 406, the process 400 captures information, with an interrupt handler, for the monitored thread on a current processor. In addition, at a process block 408, the process 400 suspends, with the interrupt handler, the monitored thread. At a process block 410, the process 400 activates a sampler thread that runs on the current processor. In addition, at a process block 412, the process 400 binds, with the sampler thread, the monitored thread to the processor. The sampler thread may perform the binding by utilizing available APIs and/or operating system services. At a process block 414, the process 400 resumes, with the sampler thread, the monitored thread after the binding. Resuming the thread before retrieving the call stack may be eliminated under some conditions; however, resuming may be required for profiling where a virtual machine interface is used that may require that the monitored thread reach a safe point or make some forward progress before it can return the call stack. Further, at a process block 416, the process 400 retrieves, with the sampler thread, a call stack for the monitored thread after the binding. In one embodiment, the process 400 restores the binding of the monitored thread after the call stack has been retrieved.

When the call stack is retrieved, various actions may take place. In one embodiment, the retrieved call stack is walked into a tree and the leaf node of the tree has its base count incremented, which allows for utilization of the technology to produce reports or to view the collected information.

Figure 5:
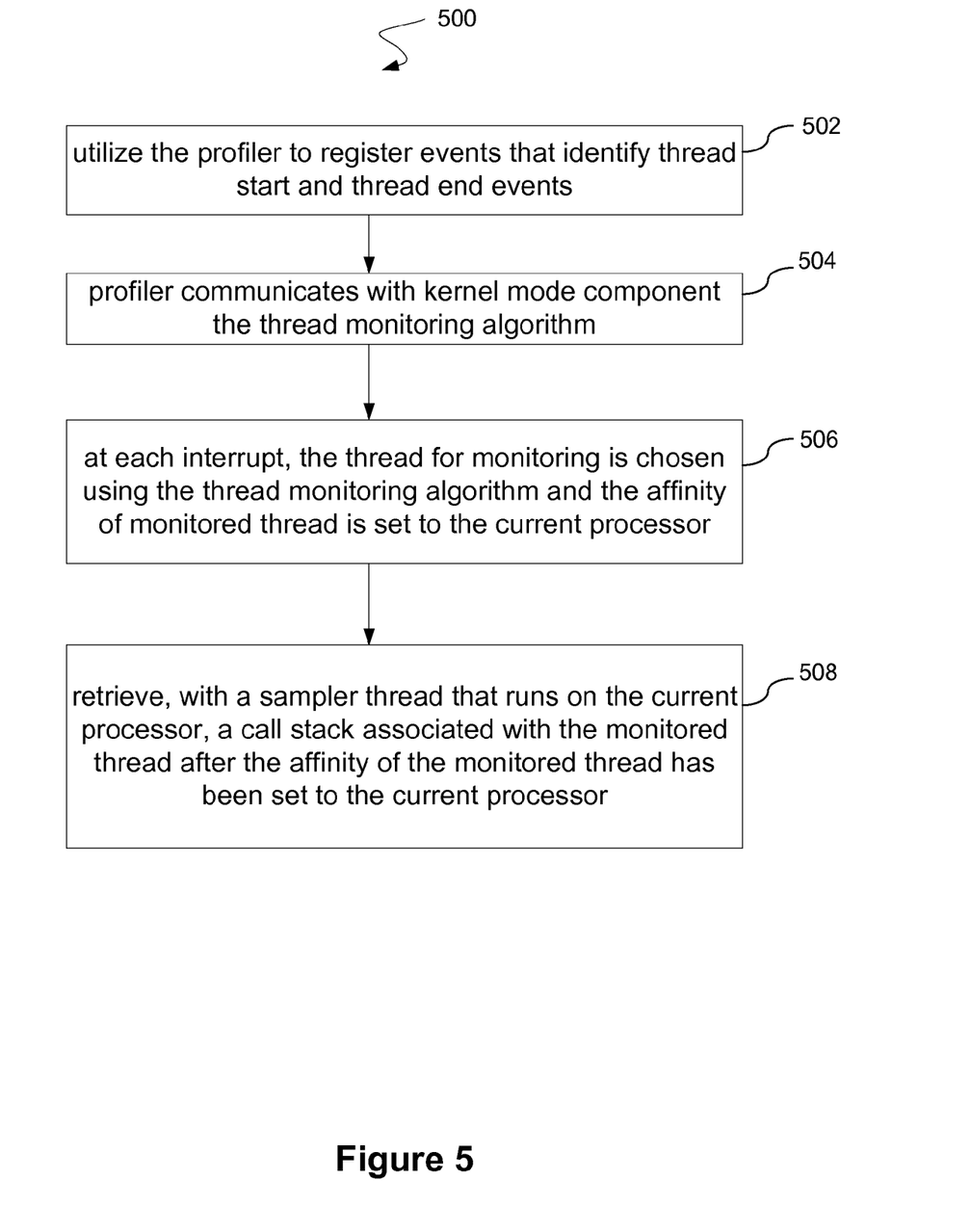
FIG. 5 illustrates a process 500 that may be utilized to choose a thread for call stack retrieval at each sample according to an embodiment of the present invention.

FIG. 5 illustrates a process 500 that may be utilized to choose threads for monitoring using a predetermined mechanism according to an embodiment of the present invention. At a process block 502, the process 500 utilizes the profiler 104 to register events that identify start thread and end thread events. As an example, a virtual machine tool interface event may send start thread and end thread events to profiler 104. The start thread events may include the names of the started threads. Alternatively, the profiler may register operating system thread start and end events to keep track of thread identifications for active threads. Further, at a process block 504, the process 500 communicates to the kernel mode component 120 the methodology to be used to select threads to be monitored to support call stack sampling. Various methodologies may be used to identify which threads to monitor. In one embodiment, the profiler 104 may be programmed by the end user to have a warm up period where normal (interrupted thread) call stack sampling is used to identify threads for monitoring and those interrupted threads are marked for monitoring in the profiler 104 control block. Alternatively, the kernel mode component 120 may mark the threads interrupted during the warm up phase as threads to be monitored in its control blocks. In another embodiment, the profiler 104 may enable entry/exit events for a list of methods and identify those threads for which the selected methods are executed. Dynamic instrumentation may be used for identifying native code functions that are executed. In another embodiment, the profiler 104 may tell the kernel mode component 120 which thread to monitor on the next interrupt, or the kernel mode component 120 may simply select a thread to monitor. During the monitoring phase the performance analyst may communicate with the profiler 104 to dynamically change the mechanism and pass that changed mechanism to the kernel mode component 120. As an example, the mechanism for choosing the next thread may involve rotating through all threads using a round robin approach to get the next thread in a linked list. The items in the list may be required to meet some predetermined criteria, for example, only selecting threads that have last executed on the current processor. Some threads may be identified as those that do not have call stacks or threads not meeting the predetermined criteria may be eliminated or bypassed while the list is traversed. Virtually any method for choosing the monitored thread may be used, such as, choosing a thread identifier at random from the list of thread identifiers. Another approach may be to indicate a count of times a thread is interrupted and use the count of interrupts for each thread to weight the thread randomized choice. In addition, at a process block 506, the process 500 at each interrupt selects a thread for monitoring using the mechanism from the process block 504 and sets the affinity of the chosen monitored thread to the current processor. This may be done in the kernel mode component 120 or the profiler 104 as supported by the operating system 106. At a process block 508, the process 500 retrieves, with a sampler thread that runs on the current processor, a call stack associated with the monitored thread after the affinity of the monitored thread has been set to the current processor. In one embodiment, the process 500 restores the affinity of the monitored thread to its original value.

The profiler 104 may record the collected call stack information in a thread oriented tree. Additionally, the profiler 104 may increment a field in the leaf node of the tree to indicate the state information recorded by the kernel mode component 120 at the time of the interrupt.

Figure 6:
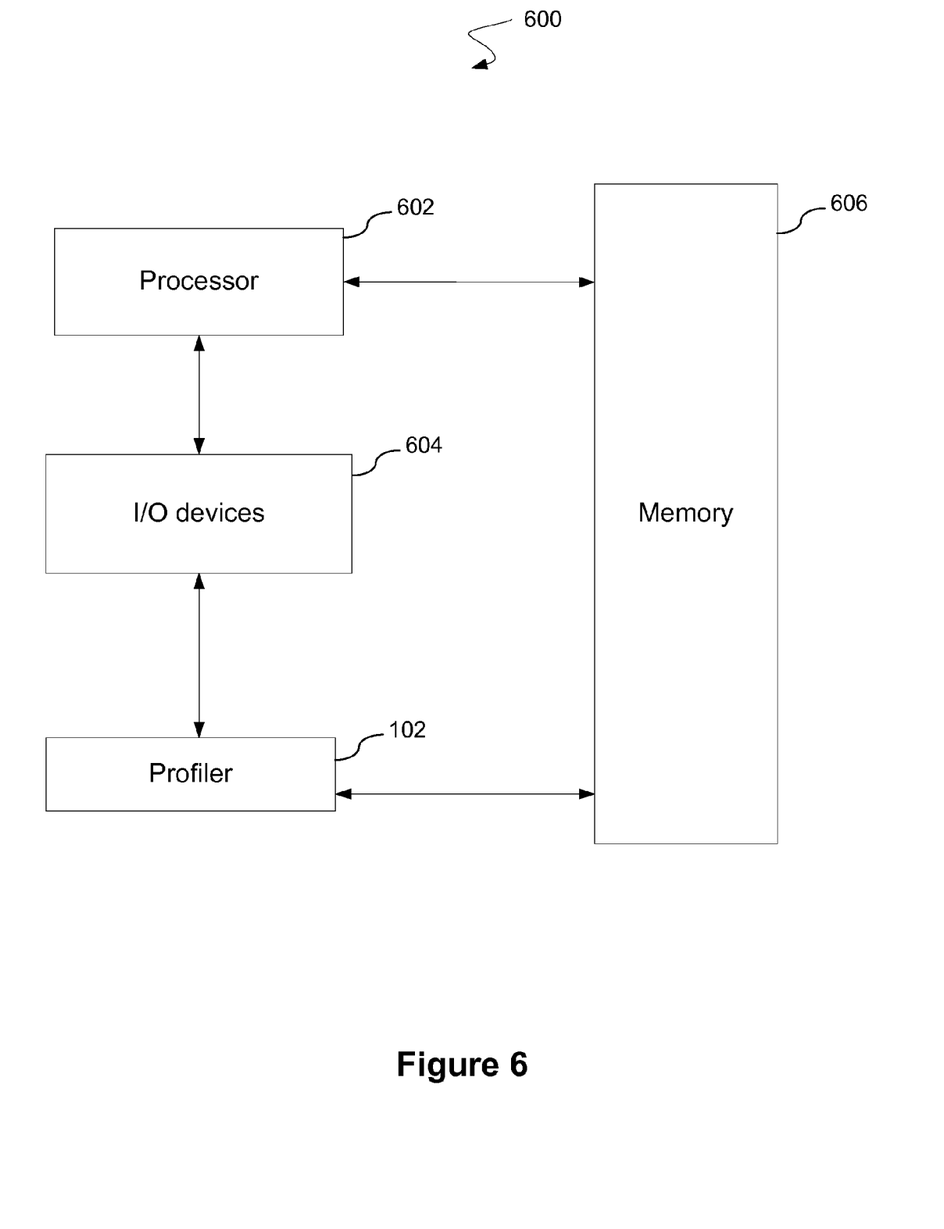
FIG. 6 illustrates a block diagram of a system 600 that prevents thread migration according to an embodiment of the present invention.

FIG. 6 illustrates a block diagram of a system 600 that prevents thread migration according to an embodiment of the present invention. In one embodiment, the system 600 is suitable for storing and/or executing program code and is implemented using a general purpose computer or any other hardware equivalents. Thus, the system 600 comprises a processor 602, a memory 606, e.g., random access memory ("RAM") and/or read only memory ("ROM"), the profiler 104, and various I/O devices 604.

The processor 602 is coupled, either directly or indirectly, to the memory 606 through a system bus. The memory 606 may include local memory employed during actual execution of the program code, bulk storage, and/or cache memories which provide temporary storage of at least some program code in order to reduce the number of times code must be retrieved from bulk storage during execution.

The input/output devices 606 may be coupled directly to the system 600 or through intervening input/output controllers. Further, the input/output devices 604 may include a keyboard, a keypad, a mouse, a microphone for capturing speech commands, a pointing device, and other user input devices that will be recognized by one of ordinary skill in the art. Further, the input/output devices 604 may include a receiver, transmitter, speaker, display, image capture sensor, biometric sensor, etc. In addition, the input/output devices 604 may include storage devices such as a tape drive, floppy drive, hard disk drive, compact disk ("CD") drive, digital video disk ("DVD") drive, etc.

Network adapters may also be coupled to the system 600 to enable the system 600 to become coupled to other systems, remote printers, or storage devices through intervening private or public networks. Modems, cable modems, and Ethernet cards are just a few of the currently available types of network adapters.

For any of the configurations described herein, various actions may take place when the call stack is retrieved. In one embodiment, the retrieved call stack is walked into a tree and the leaf node of the tree has its base count incremented, which allows for utilization of technology to produce reports or to view the collected information.

Any of the configurations described herein may be utilized with a virtual machine. A virtual machine may be configured to keep track of calling state and return that state referring to a virtual machine supported interface to return call stacks. For instance, information about execution of threads may be obtained through trace data. This information may include call stack information obtained from call stacks associated with threads of interest. A virtual machine may be utilized to obtain the call stack information. Various approaches may be utilized by the virtual machine to obtain the call stack information. For example, entry/exit events, an application timer tick, or instrumenting codes that sample the instrumented values may be utilized. A selected sampling thread may send a call to the virtual machine to obtain the call stack information. The selected sampling thread may make the call to the virtual machine through a virtual machine interface. The virtual machine interfaces may return call stack information to the sampling thread or may store the call stack information in some work area. The obtained information may be placed into a tree for later analysis.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA® (JAVA is a trademark of Oracle Corporation in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The "processor" of a general purpose computer, special purpose computer, or other programmable data processing apparatus may be referred to herein as a "microprocessor." However, the term "microprocessor" should not be interpreted as being limited to a single-chip central processing unit or any other particular type of programmable data processing apparatus, unless explicitly so stated.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Reference throughout this Specification to "one embodiment," "an embodiment," or similar language means that a particular feature, structure, or characteristic described in connection with the embodiment is included in at least one embodiment of the present invention. Thus, appearances of the phrase "in one embodiment," "in an embodiment," and similar language throughout this Specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination may in some cases be excised from the combination, and the claimed combination may be directed to a subcombination or variation of a subcombination.

While the apparatus and method have been described in terms of what are presently considered to be the most practical and preferred embodiments, it is to be understood that the invention need not be limited to the disclosed embodiments. The invention is intended to cover various modifications and similar arrangements included within the spirit and scope of the claims, the scope of which should be accorded the broadest interpretation so as to encompass all such modifications and similar structures. The present invention includes any and all embodiments of the following claims.

We claim:

1. A computer program product for multi-threading, the computer program product comprising:
    a non-transitory computer readable storage medium having computer readable program code embodied therewith, the computer readable program code comprising:
    computer readable program code configured to generate an interrupt based on an event;
    computer readable program code configured to select a thread for monitoring;
    computer readable program code configured to capture information, with an interrupt handler, for a monitored thread;
    computer readable program code configured to set an affinity of the monitored thread such that the monitored thread runs only on a current processor without being able to migrate to a different processor; and
    computer readable program code configured to retrieve, with a sampler thread that runs on the current processor, a call stack associated with a monitored thread after the affinity of the monitored thread has been set to the current processor.

2. The computer program product of claim 1, wherein the computer readable program code is also configured to restore the affinity of the monitored thread after the call stack has been retrieved.

3. The computer program product of claim 1, wherein the monitored thread is selected utilizing a subsequent thread in a list of threads.

4. The computer program product of claim 1, wherein the interrupt handler selects the monitored thread in response to taking an interrupt.

5. The computer program product of claim 1, wherein the monitored thread is selected by a sampler thread.

6. The computer program product of claim 1, wherein the monitored thread is selected randomly according to a random selection process.

7. The computer program product of claim 6, wherein the random selection process includes a weighting related to a number of times each thread is interrupted.

8. The computer program product of claim 1, wherein the current processor is busy at the time the interrupt is signaled and the monitored thread is not currently executing.

9. The computer program product of claim 1, wherein the monitored thread is selected from a list of threads identified during a warm up phase before the call stacks are recorded.

10. A method comprising:
generating, using a computer having storage, an interrupt based on an event;
selecting a thread for monitoring;
capturing information, with an interrupt handler, for a monitored thread;
setting an affinity of the monitored thread such that the monitored thread runs only on a current processor without being able to migrate to a different processor;
retrieving, with a sampler thread that runs on the current processor, a call stack associated with a monitored thread after the affinity of the monitored thread has been set to the current processor; and
restoring the affinity of the monitored thread after the call stack has been retrieved.

11. The method of claim 10, further comprising restoring the affinity of the monitored thread after the call stack has been retrieved.

12. The method of claim 10, wherein the interrupt handler selects the monitored thread in response to taking an interrupt.

13. The method of claim 10, wherein the monitored thread is selected by a sampler thread.

14. The method of claim 10, wherein the monitored thread is selected randomly according to a random selection process.

15. The method of claim 14, wherein the random selection process includes a weighting related to a number of times each thread is interrupted.

16. The method of claim 10, wherein the current processor is busy at the time the interrupt is signaled and the monitored thread is not currently executing.

17. The method of claim 10, wherein the monitored thread is selected from a list of threads identified during a warm up phase before the call stacks are recorded.

18. A system comprising:
processors; and
storage coupled to the processors, wherein the storage device has stored thereon program code, and wherein at least one of the processors is configured to execute the program code to perform operations, wherein the operations comprise:
generating an interrupt based on an event;
selecting a thread for monitoring;
capturing information, with an interrupt handler, for a monitored thread;
setting an affinity of the monitored thread such that the monitored thread runs only on a current processor of the processors without being able to migrate to a different processor of the processors; and
retrieving, with a sampler thread that runs on the current processor, a call stack associated with a monitored thread after the affinity of the monitored thread has been set to the current processor.

19. The system of claim 18, wherein the monitored thread is selected utilizing a subsequent thread in a list of threads.

20. The system of claim 18, wherein the interrupt handler selects the monitored thread in response to taking an interrupt.

21. The system of claim 20, wherein the monitored thread is selected by a sampler thread.

22. The system of claim 21, wherein the monitored thread is suspended after the monitored thread is identified.

23. The system of claim 22, wherein the monitored thread is resumed the after the affinity is set.

* * * * *